Sept. 15, 1970     F. J. ARMSTRONG     3,529,189
ROTOR COOLING TECHNIQUE
Filed June 9, 1969     2 Sheets-Sheet 1

INVENTOR:
FREDRICK J. ARMSTRONG,

BY John M. Stoudt
ATTORNEY.

Sept. 15, 1970      F. J. ARMSTRONG      3,529,189
ROTOR COOLING TECHNIQUE
Filed June 9, 1969      2 Sheets-Sheet 2
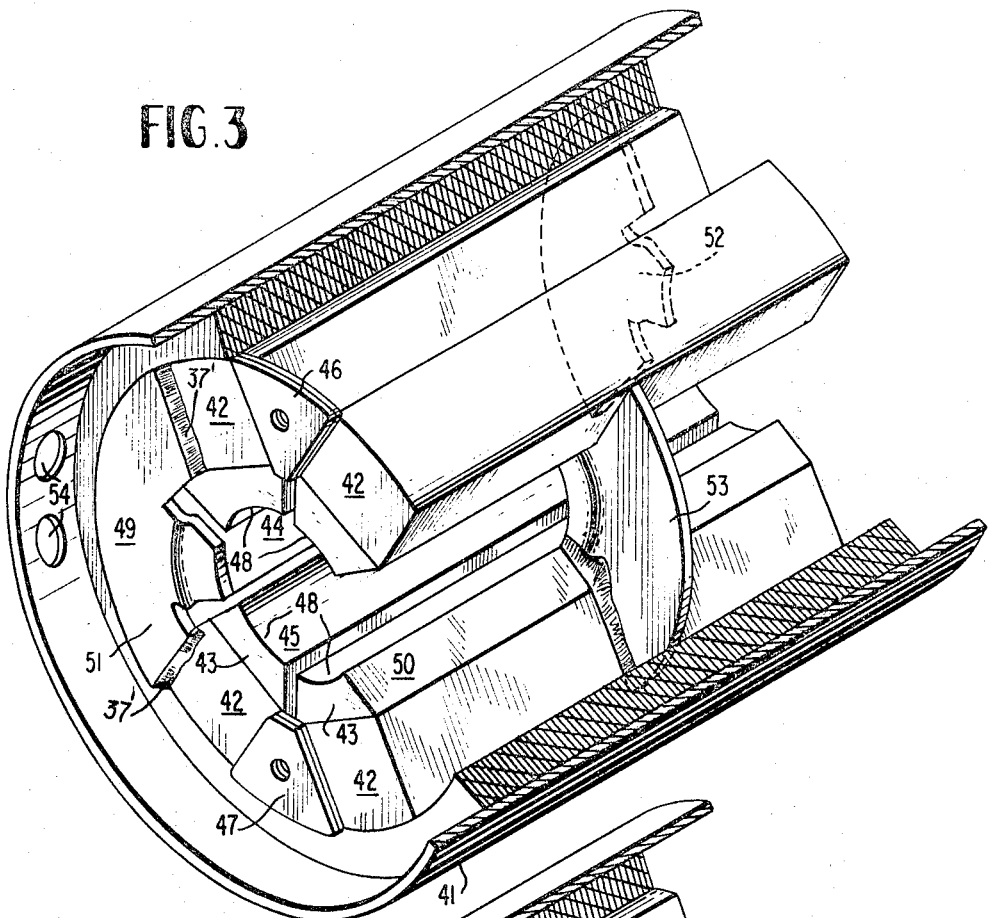
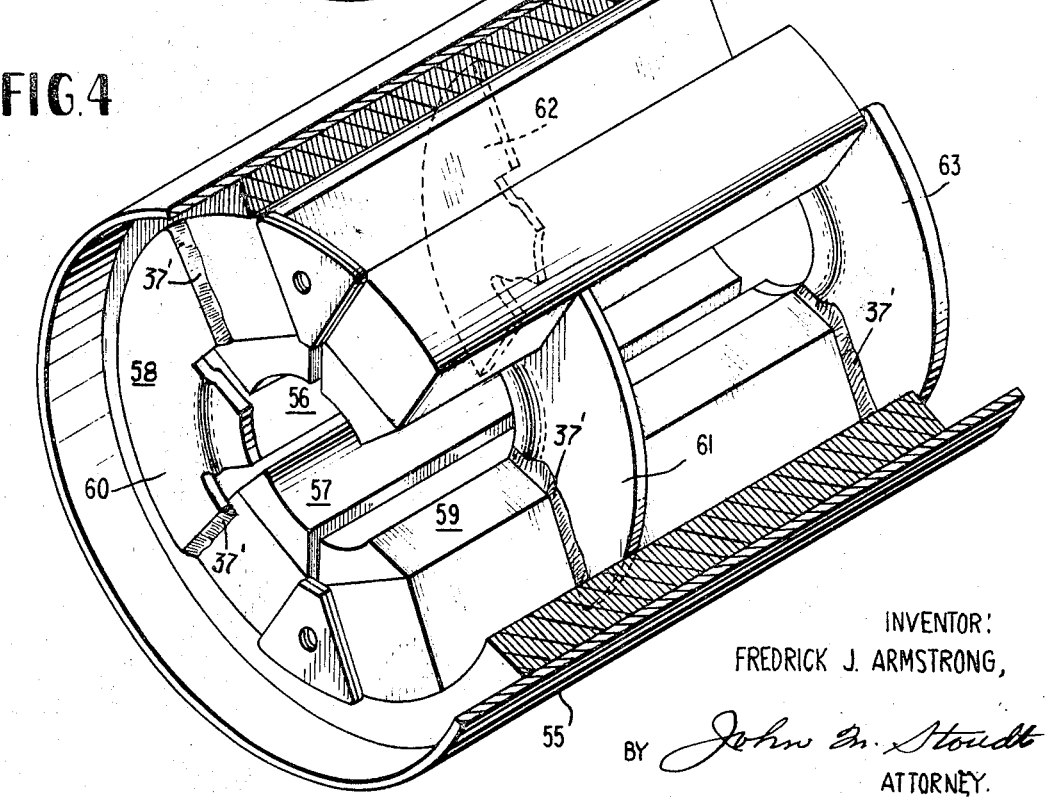
INVENTOR:
FREDRICK J. ARMSTRONG,
BY John M. Stoudt
ATTORNEY.

United States Patent Office 3,529,189
Patented Sept. 15, 1970

3,529,189
ROTOR COOLING TECHNIQUE
Fredrick J. Armstrong, Fort Wayne, Ind., assignor to General Electric Company, a corporation of New York
Filed June 9, 1969, Ser. No. 831,465
Int. Cl. H02k 9/10
U.S. Cl. 310—59         9 Claims

ABSTRACT OF THE DISCLOSURE

A high performance dynamoelectric machine includes a stator having a bore and a rotor disposed in the bore for rotation relative to the stator. The stator has at least two magnetic poles formed of a plurality of permanent magnets having pole pieces attached thereto. Cooling fluid is introduced at one end of the machine and is exhausted at the opposite end of the machine. Cooling fluid passages which communicate with the bore are formed between the poles. Alternately placed baffles in these passages cause cooling fluid to flow transversely over and around the rotor disposed in the bore. Also, additional baffles may be fixed to the stationary structure for directing the flow of cooling fluid to a commutator mounted on the rotor. In addition, a pump or fan may be connected to the machine for forcing a flow of cooling fluid through the passages.

BACKGROUND OF THE INVENTION

Field of the invention

The present invention relates to high performance, fast response dynamoelectric machines, and in particular to means for cooling such machines.

Description of the prior art

There has been an increasing demand in recent years for high performance, fast response dynamoelectric machines in the form of direct current electric motors capable of rapid response to fast changing operational requirements and conditions on the order of milliseconds. Single capstan tape transports, disc packs, high speed printers, card sorters and other computer peripheral equipment are representative of applications where exacting, fast and repeated acceleration rates as well as high current switching, are important, if not critical. To achieve rapid response to changing conditions, it is desirable that current buildup in the dynamoelectric machine be as rapid as possible during acceleration and that the current be as high as possible without causing damage to the components. In such a dynamoelectric machine, the ability to effectively dissipate heat from the rotor of the machine, especially when the motor operates at high temperature levels (internal motor ambients on the order of 100° C. and motor components near 155° C.) is a serious problem and a limitation on the performance of the machine. Some prior art machines have used a shaft mounted fan for causing a circulation of cooling air through the machine. However, such an arrangement is not practical for motors intended for computer peripheral equipment because of the considerable addition of inertia to the motor shaft, which reduces acceleration rates. In addition, such motors are frequently operated at low speeds and a shaft mounted fan would not circulate enough cooling air at such low speeds.

SUMMARY OF THE INVENTION

Accordingly, it is an object of the present invention to provide means for cooling a dynamoelectric machine.

It is a more specific object of this invention to provide means for cooling the rotor of a dynamoelectric machine.

It is a still more specific object of this invention to provide means for cooling a rotor of a dynamoelectric machine without increasing the rotor inertia.

In carrying out the invention in one form, these and other objects are achieved in a dynamoelectric machine having a stator including at least two axially extending magnetic poles defining a bore in which there is disposed a rotor separated from the poles by an air gap. Passages between the poles communicate with the air gap. Cooling fluid enters the machine at one end of the axially extending poles and exits from the machine at the opposite end of the axially extending poles. Baffles are alternately disposed in the passages between the poles to cause a flow of cooling fluid through the air gap in a transverse direction over and around the rotor. Additional baffles may be provided for causing cooling fluid flow over a commutator associated with the rotor. A pump or fan may be connected to the machine for forcing a flow of cooling fluid therethrough.

BRIEF DESCRIPTION OF THE DRAWINGS

The subject matter which is regarded as the invention is particularly pointed out and distinctly claimed in the concluding portion of the specification. The invention, itself, however, both as to its organization and method of operation, together with further objects and advantages thereof, may best be understood by reference to the following description taken in connection with the accompanying drawings in which:

FIG. 3 is an illustration partly broken away of a second form of the invention; and FIG. 4 is an illustration similar to FIG. 3 showing still another form of the invention.

DESCRIPTION OF THE PREFERRED EMBODIMENTS

Figure 1:
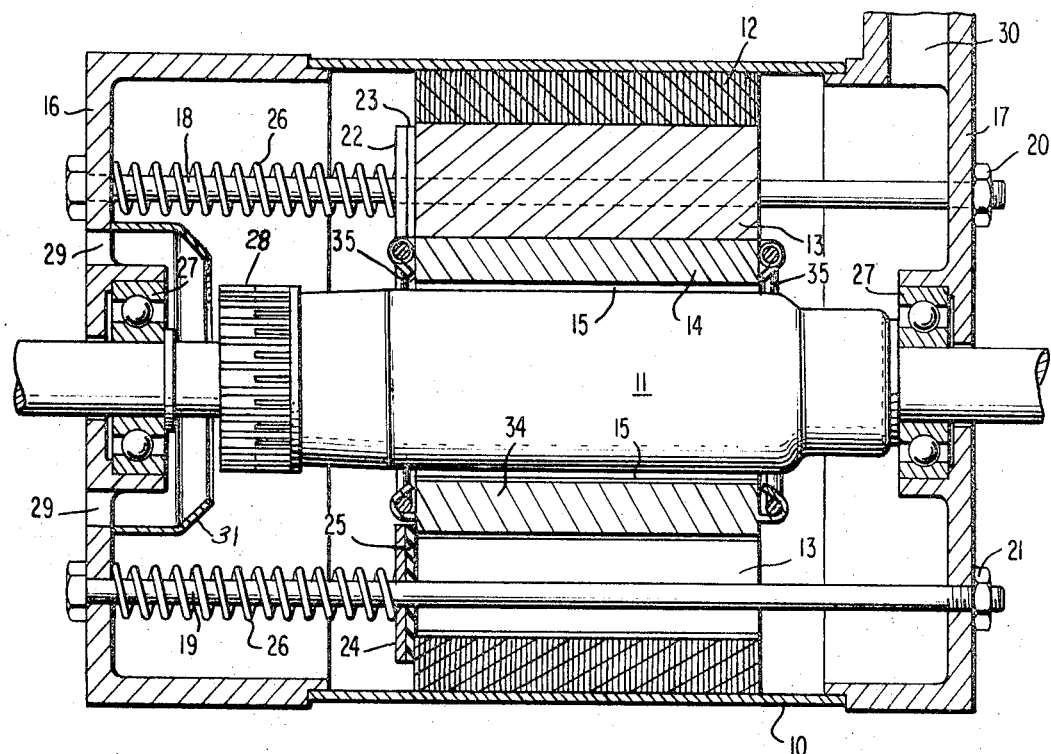
FIG. 1 is a side elevational view, partly in cross section and partly broken away of a direct current dynamoelectric machine incorporating one form of the present invention.

Turning now to the drawings in more detail, FIG. 1 illustrates one form of the present invention incorporated in an improved high performance, direct current type, two pole dynamoelectric machine suitable for use in such demanding fast response applications as single-capstan tape transports, disc packs, high-speed printers, card sorters and other computer peripheral equipment. In the illustrated form, the dynamoelectric machine comprises a stator 10 and a rotor 11. Stator 10 comprises an axially extending yoke including an outer metal housing shell 12 and an annulus of magnetic material, e.g. magnetic laminations, to which four axially extending permanent magnets 13 are adhesively secured. Axially extending pole pieces 14 are adhesively secured to magnets 13 and extend inwardly thereof. The pole pieces 14 have inner arcuate surfaces 15 which define a bore in which the rotor 11 is disposed.

End members 16 and 17 are secured to opposite ends of shell 12 by suitable means such as bolts 18 and 19 with their associated nuts 20 and 21. In the embodiment shown in FIG. 1, the bolts 18 and 19 pass through the interior of the motor between the magnets 13 of a pole inasmuch as the shell 12 is too thin to receive a threaded bolt. In larger motors constructed in accordance with the principles of this invention, the shell is much thicker and the end members can be secured to the shell by bolts threaded into the shell itself. Bolt 18 also extends through a non-magnetic baffle 22 (aluminum for example) and rubber gasket 23 at one end of the magnets 13. The baffle 22 and rubber gasket 23 serve to block an air passage between magnets 13 of a pole and are more fully discussed hereinafter. In a similar manner, bolt 19 extends through a non-magnetic baffle 24 and rubber gasket 25. Springs 26 surround bolts 18 and 19 to hold the baffles 22 and 24 in place. In larger motors where end members are secured to a shell by bolts which thread into the shell, baffles 22 and 24 might be adhesively secured. But in a machine as illustrated in FIG. 1, the bolts 18 and 19 pass through and affect the magnetic structure of the machine. The bolts 18 and 19 therefore have to be peripherally adjustable in order to adjust the magnetic neutral of the machine.

End members 16 and 17 have bearing assemblies 27 for mounting rotor 11 for relative rotation with respect to the stator 10. Rotor 11 includes a commutator 28 which is adapted to be contacted by brushes (not shown), one brush for each pole of the machine, in a manner well known in the art. End member 16 has apertures 29 through which cooling fluid for the machine is admitted, and end member 17 has an exhaust 30 through which cooling fluid exits. Baffles 31, made of a suitable non-magnetic material such as aluminum, are disposed adjacent the cooling fluid inlet apertures 29 for directing a flow of cooling fluid over the commutator 28 to provide adequate cooling thereof. A fan or pump may be connected to the exhaust 30 to insure a continuous flow of cooling fluid through the machine.

Figure 2:
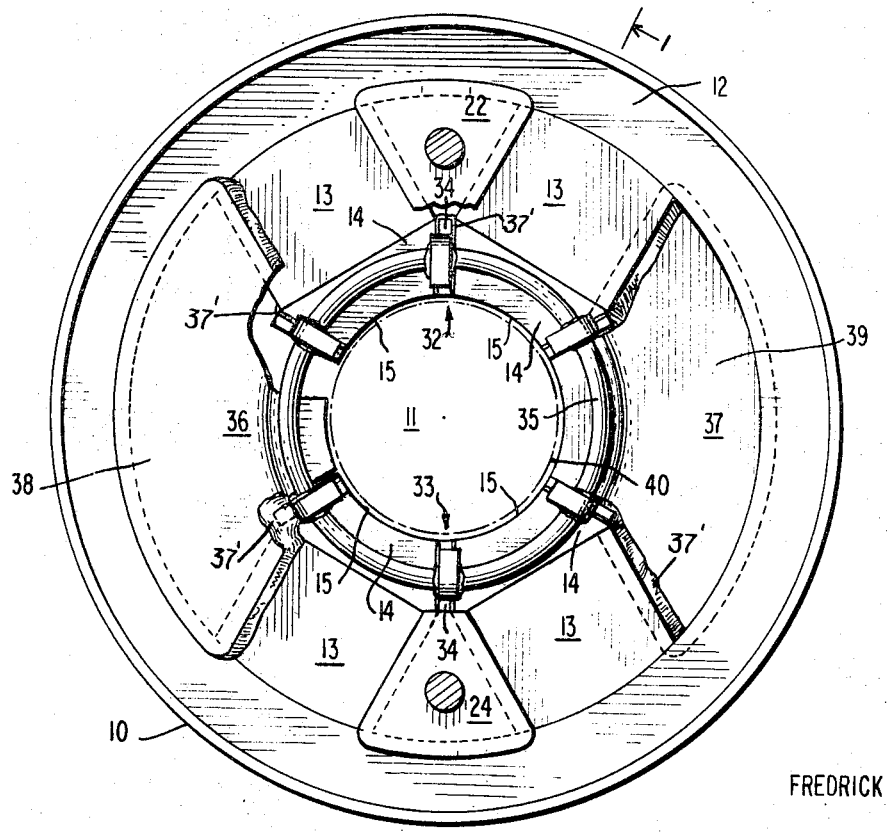
FIG. 2 is an end view of the machine of FIG. 1 with the end members removed, with the arrows 1—1 placed thereon to show the lines along which the view of FIG. 1 was taken.

FIG. 2 is an end view of the machine of FIG. 1 with the end members removed. In FIG. 2 it can be seen that the magnets 13 and pole pieces 14 form two poles generally indicated by reference numerals 32 and 33. The space between magnets 13 of pole 32 is covered with the baffle 22, made of any suitable non-magnetic material such as aluminum, and the space between magnets 13 of pole 33 is covered by the baffle 24, also made of non-magnetic material. As discussed in connection with FIG. 1, baffles 22 and 24 are held in place by springs which for clarity are not shown in FIG. 2. The pole pieces 14 of poles 32 and 33 are separated by conductors 34 which, together with conductor rings 35 to which they are connected (one at either end of the stator 10) form a short-circuited winding. Arcuate surfaces 15 of pole pieces 14 define a bore within which the rotor 11 is disposed. Two passages 36 and 37 are formed between the magnetic poles 32 and 33 and communicate with the bore. A non-magnetic baffle 38 is adhesively secured to one end of stator 10 to obstruct passage 36 and a non-magnetic baffle 39 is adhesively secured to the opposite end of stator 10 to obstruct passage 37. Cooling fluid enters stator 10 at its end where baffle 38 is disposed. Since baffle 38 obstructs passage 36 and the passages between the magnets 13 of poles 32 and 33 are obstructed by baffles 22 and 24, the cooling fluid enters passage 37. Since passage 37 is obstructed at the opposite end of stationary member 10 by baffle 39, and, in effect, defines a plenum chamber the cooling fluid must flow over and around the rotor 11 disposed in the bore in order to exit out passage 36 at the opposite end. Thus, baffles 38 and 39 cooperate to insure a flow of cooling fluid over and around the rotor 11 in order to provide efficient dissipation of the heat developed therein. Also, inasmuch as the air gap 40 formed between rotor 11 and the arcuate surfaces 15 is very small, the velocity of the fluid flow therethrough is large, contributing to efficient heat dissipation.

FIG. 3 is an illustration partially broken away of the stator of a dynamoelectric machine incorporating a second form of the invention. In FIG. 3, a shell 41 has magnets 42 and pole pieces 43 which cooperate to form two poles generally indicated by reference numerals 44 and 45. The space between magnets 42 which cooperate to form pole 44 and the space between magnets 42 which cooperate to form pole 45 are obstructed by non-magnetic baffles 46 and 47, respectively, in the same manner as discussed with respect to the stator structure of FIG. 2. Arcuate surfaces 48 of pole pieces 43 define a bore which is adapted to receive a rotor. Two passages 49 and 50 are formed between magnetic poles 44 and 45 which communicate with the bore. A non-magnetic baffle 51 is adhesively secured to one end of stator 41 to obstruct passage 49 and a non-magnetic baffle 52 is adhesively secured to the opposite end of stator 41 to also obstruct passage 49. An additional non-magnetic baffle 53 is adhesively secured in passage 50 half way along its axial length to obstruct passage 50. Cooling fluid enters stator 41 at its end where baffle 51 is disposed. Since baffle 51 obstructs passage 49, and the passages between magnets 42 of poles 44 and 45 are obstructed by baffles 46 and 47, the cooling fluid enters passage 50. Since passage 50 is obstructed in the middle of stator 41 by baffle 53 the cooling fluid must flow transversely through the bore, and consequently over and around a rotor disposed in the bore in order to enter passage 49. Since passage 49 is obstructed at the end of stator 41 by another non-magnetic baffle 52, the cooling fluid must again flow transversely through the bore and consequently over and around a rotor disposed in a bore in order to exit out passage 50 of stator 41. Thus, baffles 51, 52 and 53 cooperate to cause a flow of cooling fluid which traverses the bore twice in a transverse direction so that, when a rotor is disposed in the bore, the path of the cooling fluid passes twice over and around the rotor. This provides very efficient dissipation of the heat developed in the rotor. Also, inasmuch as the space between a rotor and the arcuate surfaces 48 is very small, the velocity of fluid flow therethough is large, contributing to efficient heat dissipation. It is to be noted that in the form of the invention shown in FIG. 3 cooling fluid inlet holes 54 are formed in the shell of stator 41 rather than in an end member as was discussed in connection with FIG. 1. Baffles 51, 52 and 53 may be constructed of any suitable material which will not interfere with the magnetic flux characteristics of the dynamo-electric machine. In a preferred embodiment of the invention these baffles are constructed of aluminum. The cooling fluid also may be any suitable gas or liquid, but air has proved to be satisfactory for most applications.

FIG. 4 is an illustration partially broken away similar to FIG. 3 showing still another form of the invention. In FIG. 4, a stator 55 has two magnetic poles 56 and 57 separated by passages 58 and 59, as before. A non-magnetic baffle 60 is disposed at one end of stator 55 and serves to obstruct passage 58. A non-magnetic baffle 61 magnetic baffle 60 is adhesively secured in passage 59 and axially spaced some distance along stator 55 from non- serves to obstruct passage 59. Another non-magnetic baffle 62 axially spaced some distance from non-magnetic baffle 61 is adhesively secured in passage 58 and serves to obstruct passage 58. A non-magnetic baffle 63 is disposed at the end of stator 55 opposite the end where non-magnetic baffle 60 is disposed and serves to obstruct passage 59. Cooling fluid enters the stator structure at its end where the non-magnetic baffle 60 is disposed. Since the baffle 60 obstructs passage 58, the cooling fluid enters passage 59. Passage 59 is obstructed by baffle 61 so the cooling fluid must flow transversely through the bore in order to enter passage 58. The cooling fluid flows along passage 58 for some distance until it reaches non-magnetic baffle 62. Non-magnetic baffle 62 obstructs passage 58 at this point so that the cooling fluid must again flow transversely across the bore in order to reenter passage 59. Passage 59 is obstructed at the end of stator 55 by another non-magnetic baffle 63. The cooling fluid must therefore flow again transversely through the bore in order to exit out passage 58. Thus, the combination of baffles 60, 61, 62 and 63 cause cooling fluid to flow transversely across the bore three times during its passage through the stator 55. When a rotor is disposed in the bore, the cooling fluid flows transversely over and around the rotor on its passage through the stator 55. Also, inasmuch as the space between the rotor and the bore is very small, the velocity of the fluid flow therethrough is large, contributing to efficient heat dissipation. The non-magnetic baffles may be constructed of any suitable material which will not interfere with the magnetic flux characteristics of the stator 41. In a preferred embodiment of the invention these baffles are constructed of aluminum. The cooling fluid may be any suitable gas or liquid, but air has proved to be satisfactory for most applications.

The invention has been shown and described with reference to a two pole dynamoelectric machine with each pole consisting of two permanent magnets with adjoining pole pieces. However, it is obvious that the invention is also applicable to dynamoelectric machines having four or more poles or to dynamoelectric machines having poles formed of more than two permanent magnets. With such machines, it would be necessary to have more baffles. For example, a baffle would have to be supplied to obstruct passages formed between the magnets of a pole; for instance, if each pole is formed of three magnets, there would have to be two baffles per pole to obstruct the two spaces between the three magnets. Likewise, if a machine consisted of more than two poles, there would have to be a plurality of baffles for alternately obstructing the passages formed between the various poles of the machine. In a similar manner, the number of alternate baffles in the passages of a machine can be increased to cause fluid to flow transversely across a bore more than three times.

Thus, it should be apparent to those skilled in the art that, while what at present is considered to be the preferred embodiment of the invention has been shown and described in accordance with the patent statutes, modifications such as described above can be made without actually departing from the true spirit and scope of this invention. It is intended therefore to cover in the following claims all such equivalent variations as fall within the invention.

What is claimed as new and desired to be secured by Letters Patent in the United States is:

1. A dynamoelectric machine comprising a stator having at least two axially extending magnetic poles defining a bore and at least two passages between the magnetic poles which communicate with the bore, a rotor disposed in the bore and spaced from the poles by an air gap, the machine having cooling fluid inlet means and cooling fluid outlet means, a plurality of baffles including a first baffle disposed across a first one of the passages, and a second baffle disposed in axially spaced relation to the first baffle and disposed across a second one of the passages, said cooling fluid inlet and outlet means being located to permit cooling fluid to flow through the machine, said plurality of baffles and passages being cooperative to cause cooling fluid to flow transversely through the air gap over and around said rotor.

2. The dynamoelectric machine of claim 1, wherein said rotor includes a shaft and a commutator mounted thereon and the machine further comprises at least one baffle disposed adjacent said cooling fluid inlet means for directing cooling fluid flow across said commutator.

3. The dynamoelectric machine of claim 1, wherein said plurality of baffles are constructed of non-magnetic material.

4. The dynamoelectric machine of claim 1, wherein the first passage and the first baffle define an axially extending plenum chamber for cooling fluid whereby cooling fluid admitted axially into said chamber flows transversely through the air gap over and around said rotor.

5. The dynamoelectric machine of claim 1, wherein the first baffle is disposed across one end of the first passage and the second baffle is disposed across one end of the second passage remote from said one end of the first passage.

6. The dynamoelectric machine of claim 5, wherein at least one additional baffle is disposed across the second passage in axially spaced relation to said second baffle.

7. The dynamoelectric machine of claim 1, wherein each of said poles comprises a plurality of magnets separated by spaces and said plurality of baffles include baffles disposed across each end of said spaces.

8. The dynamoelectric machine of claim 7, wherein said baffles are constructed of aluminum.

9. A method of cooling a dynamoelectric machine having a stator defining a bore and a rotor disposed in the bore with axial pasages in the stator communicating with the bore comprising the steps of:
    (a) flowing cooling fluid axially through a first one of the passages a predetermined distance;
    (b) impeding the axial flow of cooling fluid beyond said predetermined distance in said first one of the passages and flowing the cooling fluid transversely across the bore between the rotor and stator; and
    (c) discharging the cooling fluid from the machine.

References Cited
UNITED STATES PATENTS

| | | | |
|---|---|---|---|
| 2,264,838 | 12/1941 | Greer | 310—64 |
| 2,974,239 | 3/1961 | Havelka et al. | 310—61 |
| 2,693,543 | 11/1954 | Martin et al. | 310—227 |
| 2,903,610 | 9/1959 | Bessiere | 310—254 |
| 3,188,833 | 6/1965 | Robinson | 310—54 XR |

FOREIGN PATENTS

| | | |
|---|---|---|
| 1,225,288 | 9/1966 | Germany. |
| 203,503 | 4/1966 | Sweden. |

MILTON O. HIRSHFIELD, Primary Examiner

B. A. REYNOLDS, Assistant Examiner

U.S. Cl. X.R.

310—65